United States Patent [19]

Maruyama et al.

[11] Patent Number: 5,710,920
[45] Date of Patent: Jan. 20, 1998

[54] OBJECT EXTENDING METHOD

[75] Inventors: Takeo Maruyama, Osaka; Satoshi Wakayama, Sakai; Yo-ichi Yamamoto, Takatsuki, all of Japan

[73] Assignee: Hitachi, Ltd., Tokyo, Japan

[21] Appl. No.: 362,873

[22] Filed: Dec. 23, 1994

[30] Foreign Application Priority Data

Dec. 28, 1993 [JP] Japan ............................... 5-338052

[51] Int. Cl.⁶ .................................................. G06F 17/30
[52] U.S. Cl. ...................... 395/614; 395/613; 395/671; 395/703
[58] Field of Search ........................ 395/600, 700, 395/161, 614, 613, 671, 703; 364/200

[56] References Cited

U.S. PATENT DOCUMENTS

| | | | |
|---|---|---|---|
| 4,914,568 | 4/1990 | Kudosky et al. | 364/200 |
| 5,327,559 | 7/1994 | Priven et al. | 395/700 |
| 5,475,843 | 12/1995 | Halviatti et al. | 395/700 |
| 5,495,567 | 2/1996 | Iizawa et al. | 395/161 |
| 5,561,752 | 10/1996 | Jevans | 395/133 |
| 5,590,330 | 12/1996 | Talati | 395/700 |

*Primary Examiner*—Wayne Amsbury
*Assistant Examiner*—Cheryl R. Lewis
*Attorney, Agent, or Firm*—Antonelli, Terry, Stout, & Kraus, LLP

[57] ABSTRACT

In an object extending method for use in an object-oriented data base system having an object having an attribute, a relation and a procedure and a definition object having definition information determining a structure of the object, information on changes in attribute, relation and procedure which accompany a change in the definition object is held as a parts object in the definition object, and data to be newly appended to the object as a result of the change in the definition object is held as a parts object in the object, so that work to change the object in accordance with a change in schema may be reduced.

20 Claims, 13 Drawing Sheets

FIG. 2A

TYPE DEFINITION

| | |
|---|---|
| VERSION NUMBER [arrayOf[char]] | 201 |
| TYPE NAME [arrayOf[char]] | 202 |
| NUMBER OF ATTRIBUTES [int] | 203 |
| ATTRIBUTE SET [arrayOf[ attributes ]] | 204 |
| NUMBER OF PROCEDURES [int] | 205 |
| PROCEDURE SET [arrayOf[ procedures ]] | 206 |

FIG. 2B

ATTRIBUTE DEFINITION

| | |
|---|---|
| ATTRIBUTE NAME [arrayOf[char]] | 207 |
| DATA TYPE [enumOf[int,string]] | 208 |
| DATA LENGTH [int] | 209 |

FIG. 2C

PROCEDURE DEFINITION

| | |
|---|---|
| SELECTOR NAME [arrayOf[char]] | 210 |
| NUMBER OF PARAMETERS [int] | 211 |
| PARAMETER TYPE GROUP [arrayOf[enumOf int,string] | 212 |
| RETURN VALUE TYPE [enumOf[int,string]] | 213 |
| EXECUTION CODE [binaryCode] | 214 |

FIG. 3A

RELATION DEFINITION

| | |
|---|---|
| RELATION NAME [arrayOf[char]] | 215 |
| RELATION CLASSIFICATION [enumOf[1:1,1:n,m;1,n:m]] | 216 |
| NUMBER OF RELATION ORIGINATOR TYPES [int] | 217 |
| RELATION ORIGINATOR TYPE SET [arrayOf[ type ]] | 218 |
| NUMBER OF RELATION DESTINATION TYPES [int] | 219 |
| RELATION DESTINATION SET [arrayOf[ type ]] | 220 |
| RELATION MEANING [enumOf[Parts,NULL]] | 221 |
| NUMBER OF RELATION ATTRIBUTES [int] | 222 |
| RELATION ATTRIBUTES [arrayOf[ attributes ]] | 223 |
| RELATION GROUP [arrayOf[ relation pairs ]] | 224 |

FIG. 3B

RELATION PAIR DEFINITION

| | |
|---|---|
| RELATION ORIGINATOR OBJECT [oid] | 225 |
| RELATION DESTINATION OBJECT GROUP [arrayOf[oid]] | 226 |
| RELATION ATTRIBUTE DATA GROUP [arrayOf[unionOf[int,string]]] | 227 |

FIG. 4A
PARTS ATTRIBUTE DEFINITION

| | |
|---|---|
| VERSION NUMBER [arrayOf[char]] | 228 |
| OPERATION CODE [enumOf[append,delete] | 229 |
| UPDATE POSITION [int] | 230 |
| ATTRIBUTE NAME [arrayOf[char]] | 231 |
| DATA TYPE [arrayOf[enumOf[int,string]] | 232 |
| DATA LENGTH [int] | 233 |

FIG. 4B
PARTS PROCEDURE DEFINITION

| | |
|---|---|
| VERSION NUMBER [arrayOf[char]] | 234 |
| OPERATION CODE [enumOf[append,delete] | 235 |
| SELECTOR NAME [arrayOf[char]] | 236 |
| NUMBER OF PARAMETERS [int] | 237 |
| PARAMETER TYPE GROUP [arrayOf[enumOf[int,string]]] | 238 |
| RETURN VALUE TYPE [enumOf[int,string]] | 239 |
| EXECUTION CODE [binaryCode] | 240 |

FIG. 5A
RELATION MANAGEMENT DEFINITION

| | |
|---|---|
| RELATION NAME [arrayOf[char]] | 241 |
| RELATION [arrayOf[ relation pairs ]] | 242 |

FIG. 5B
STRUCTURE CHANGE DEFINITION

| | |
|---|---|
| STRUCTURE CHANGE ATTRIBUTE DATA GROUP [enumOf[int,string]] | 243 |

FIG.6A PERSON TYPE

| T1 | 1 | person | 2 | name | string | 32 | age | int | 4 | 0 | ╳ |
|---|---|---|---|---|---|---|---|---|---|---|---|

301

FIG.6B COMPUTER TYPE

| T2 | 1 | computer | 3 | type name | string | 32 | memory size | string | 32 | OS name | int | 4 | 0 | P1 | P3 |
|---|---|---|---|---|---|---|---|---|---|---|---|---|---|---|---|

302

FIG.6C PROCESSOR TYPE

| T3 | 1 | processor | 2 | type name | string | 32 | mega-clock number | int | 4 | 0 | ╳ |
|---|---|---|---|---|---|---|---|---|---|---|---|

303

FIG.6D PROCESSOR RELATION

| R1 | processor | 1:1 | 1 | T2 | 1 | T3 | Parts | rm1 |
|---|---|---|---|---|---|---|---|---|

304

FIG.6E RELATION SET OBJECT

| rm1 | r1 |
|---|---|

305

FIG.6F RELATION PAIR OBJECT

| r1 | O2 | O3 |
|---|---|---|

PARTS ATTRIBUTE OBJECT

| P1 | 2 | append | 4 | hard-disc size | int | 4 | delete | 3 | OS name |

401

| P2 | 2 | append | 0 | ownership months | int | 4 |

PARTS PROCEDURE OBJECT

| P3 | 2 | append | onUnix | 0 | boolean | ...... |

403

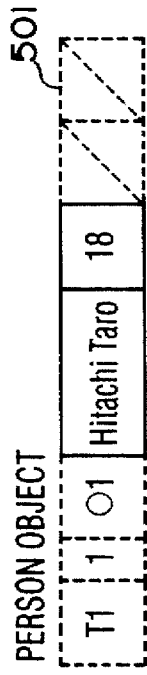
FIG.8A
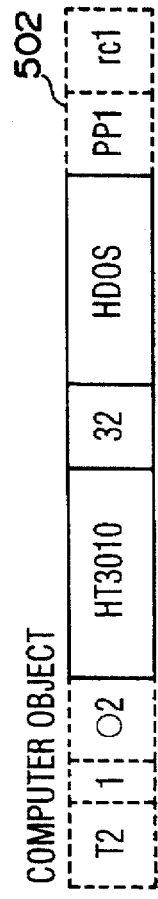
FIG.8B
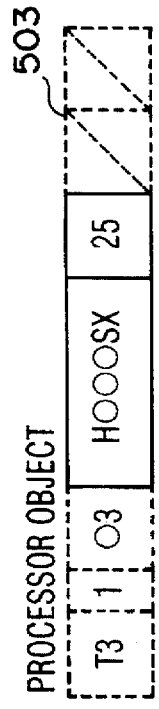
FIG.8C
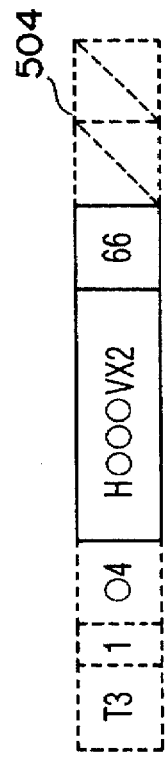
FIG.8D
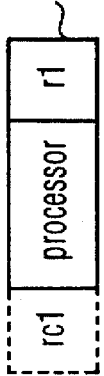
FIG.8E computer {2, attribute ( type name, memory size, hard-disc size )}

:5,710,920

OBJECT EXTENDING METHOD

BACKGROUND OF THE INVENTION

The present invention relates to an object-oriented data base system and more particularly to a method of extending objects suitable for changing an object in accordance with a change in a definition of the object.

In a conventional data base system, when a schema (which is a set of definitions of data) is changed, this change affects data before changing because a change in schema changes the data structure. The time that the data structure is allowed to be changed is a matter of importance. A similar problem arises also in an object-oriented data base. Immediate-update or deferred-update is available as a way to cope with this problem.

In a method based on immediate-update, all objects to be affected by an update of schema are changed simultaneously at the time of the update of schema. In this method, when a great number of objects exist, the amount of change work accompanying the change of schema is large.

On the other hand, in a method based on deferred-update, when an object to be affected by an update of schema is accessed after the update of schema, work to reflect the change is carried out. In this case, attribute appending/ insertion is effected by inputting NULL data to update the object. This latter method has a higher processing speed for schema update than the former method but in this method, objects not to be accessed remain to have structures complying with the old schema and when accessed, it must first be decided what definition structures exist and then they must be changed in accordance with the corresponding definition information. The immediate-update and deferred-update are described, for example, in the publication "Introduction to Object-oriented Databases" by Wom Kim, MIT press, pp. 50–52.

In connection with the processing as described above, only the method of updating an object after a schema is changed is studied. However, inventors of the present invention have become aware of the fact that the schema change processing per se is practically a matter of problem. Usually, when an object is operated, a shared lock is applied to a schema corresponding to a definition of the object to indicate that schema information is being referred to, thus preventing the other processes from undertaking an update of schema. This is a must for the sake of warranting the compatibility of data base. Accordingly, so long as a process which is operating an object exists, the corresponding schema is not permitted to be changed.

The present inventors have also become aware of the fact that the prior art imposes stringent conditions on practicability of schema change in the course of simultaneous operation of a schema change and an object operation and fails to consider incapability of operating any object during the schema change.

SUMMARY OF THE INVENTION

One objective of the present invention is to permit an object to be changed in terms of attribute, relation and procedure independently of schema definition information in an object-oriented data base for storing objects, each having an attribute, a relation and a procedure.

To accomplish the above objective, according to the present invention, in an object-oriented data base system having an object having an attribute, a relation and a procedure and a definition object having definition information for determining a structure of the object, information on changes in attribute, relation and procedure, which accompany a change in the definition object, is held as a parts object in the definition object, and data newly appended to the object as a result of the change in definition object is held as a parts object in the object.

In the present invention, by holding as a parts object information on changes in attribute, relation and procedure which accompany a change in schema in a definition object, operations such as appending/deletion of attribute, relation and procedure and definition change can be applied to an object without changing any schema definition. Data to be newly appended to the object as a result of the definition change is also held as a parts object in that object as in the case of the definition object. A definition object after the definition change is virtually generated by the definition object and the parts object held by the definition object. Further, an object corresponding to the virtually generated definition object is virtually generated in a similar manner by the object and the parts object held by the object and therefore, the user can see the virtually generated definition object and the virtually generated object and is allowed to operate the object through the same operation as that before the change.

BRIEF DESCRIPTION OF THE DRAWINGS

FIGS. 2A to 2C show type definition information, attribute definition information and procedure definition information in meta-definition information, respectively.

FIGS. 3A and 3B show relation definition information and relation pair definition information in the meta-definition information, respectively.

FIGS. 4A and 4B show parts attribute definition information and parts procedure definition information in the meta-definition information, respectively.

FIGS. 5A and 5B show relation management definition information and structure change definition information in the meta-definition information.

FIGS. 6A to 6F show examples of a type definition object and a relation definition object.

FIGS. 7A and 7B show examples of a parts object to be appended to a definition object.

FIGS. 8A to 8E show examples of object based on schema definition.

DESCRIPTION OF THE PREFERRED EMBODIMENTS

In accordance with the present invention, an object is represented by data having a type and contains an attribute and a procedure for determining behavior of the object. The attribute is determined definitely in terms of type and is identified by an attribute name. The procedure is also determined definitely in the terms of type and is identified by the order of a selector name and a parameter type. A relation between objects is held in the form of a relation definition. The relation definition is determined definitely in a schema and is identified by a relation name. The attribute, relation and procedure are collectively called a "characteristic" of the object.

In the attribute of the object, the type of the object can be described (in other words, the object per se is held and referred to). Actually, an object identifier is used in a system to definitely determine an object, and therefore the object identifier is held as data indicative of the attribute. For the object type, the attribute can be discriminated from the relation at the discretion of the user. The relation prescribes what relation exists between a relation originator in a relation originator type and a relation destination in a relation destination type. Relations exist between every object belonging to the relation originator type defined by the relation and every object belonging to the relation destination type defined by the relation. The relation can hold the attribute.

A definition for prescribing a characteristic (attribute, relation and procedure) of an object is called a "type" of the object. A set of types is called a "schema". Information defined by a type is called "meta-definition" information. The schema and the meta-definition information also contain a type of a parts object and meta-definition information of the parts object type.

In the present embodiment, for appending, deleting and updating of a characteristic of an object, the type (definition) of the object is required to be changed. At that time, change information and data are held as a parts object in system information of the object. The parts object, being a kind of object, also has a type and is held on a data base (DB). In the present embodiment, of the type change, update is replaced by deletion and appending. The parts objects are appended in the last position of the system information of the object.

Figure 1:
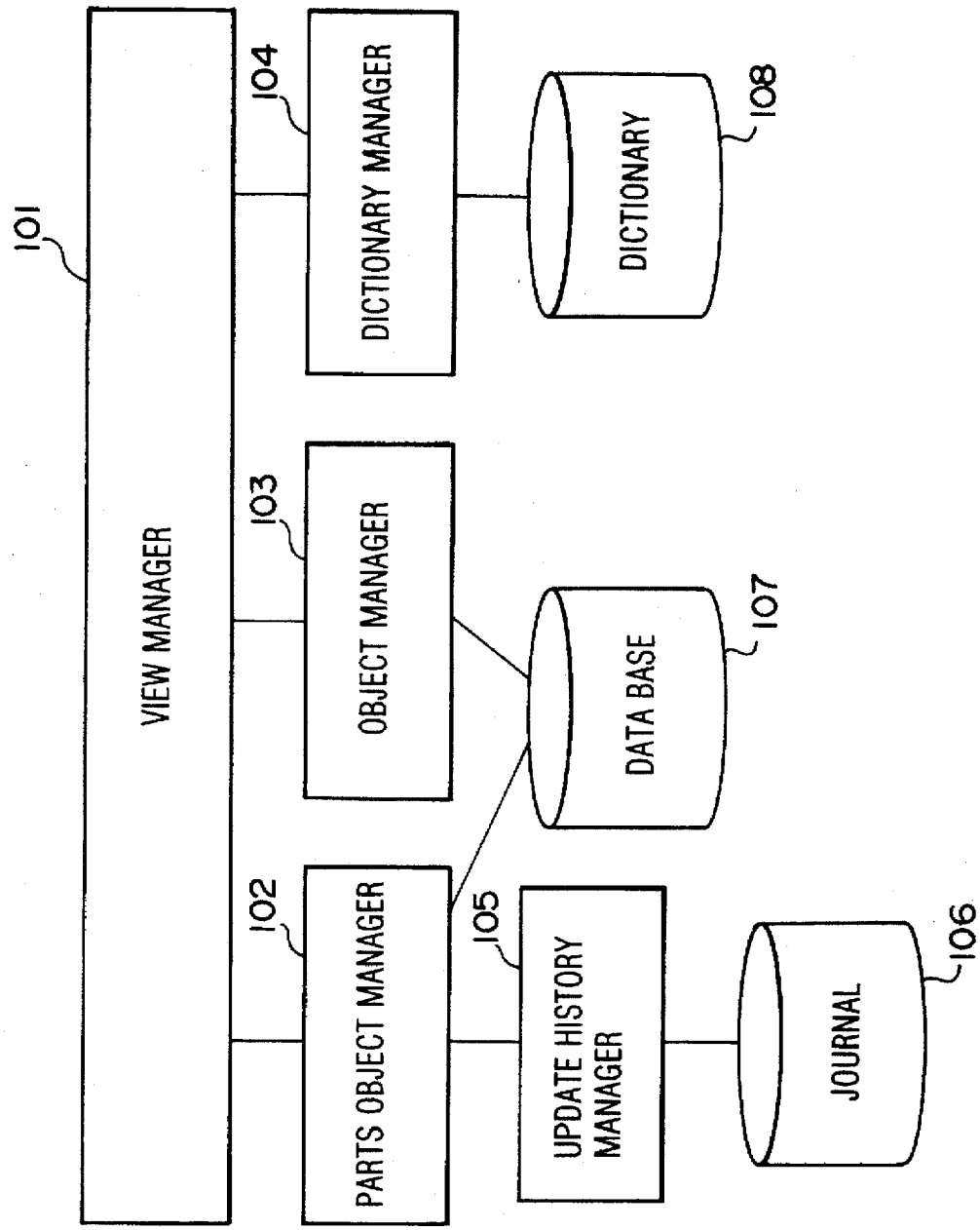
FIG. 1 is a block diagram showing the construction of a system according to an embodiment of the present invention.
Figure 9A:
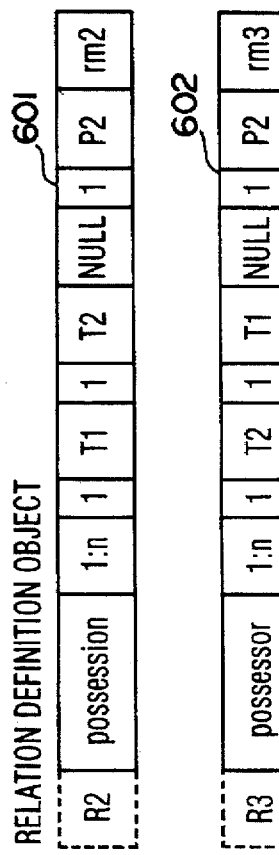
FIGS. 9A to 9D show examples of relation definition object, relation pair set object, relation management object and relation pair object after relation change, respectively.
Figure 9B:
Figure 9C:
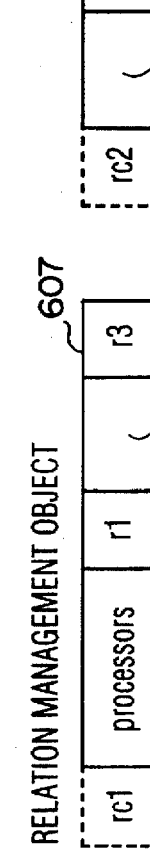
Figure 9D:

FIG. 1 is a block diagram showing the construction of a system according to an embodiment of the present invention. A view manager 101 is a section which converts an object defined by the user into a structure (view) the user wants to see so as to offer the structure to the user and receives a command and data from the user. A parts object manager 102 is a section which manages a parts object to be held on a data base (DB) 107 when a characteristic based on a new definition is prescribed for an object which has already been defined. An object manager 103 is a section for managing an object which has already been defined on the DB 107. A dictionary manager 104 is a section for managing type information of an object which has already been defined on a dictionary 108. An update history manager 105 is a section for managing update history information taken out of a parts object on the DB 107 through the part object manager 102 and delivering the information to a journal 106. The data base (DB) 107 holds objects and parts objects and the dictionary 108 holds type (definition) information.

FIG. 2A to FIG. 5B show details of meta-definition information. Various kinds of meta-definition information to be described below are models of information to be described later with reference to FIG. 6A to FIG. 8D and they are saved in the dictionary 108 and managed by the dictionary manager 104. Here, [ ] indicates a type of the definition, showing that arrayOf[ ] is a definition described in terms of a padding array, enumOf[ ] is a definition described in terms of an enumerative type and unionOf[ ] is a definition described in terms of a union type. Further, "oid" and "binary Code" in [ ] indicate an object identifier and a variable length binary code, respectively. Here, integer (int) and character string (string) are presented as system offering types usable in type definition. Each type information piece can be handled as an object and hence holds an object identifier.

Meta-definition information of a type is shown at 201 to 206 in FIG. 2A wherein 201 designates a version number for managing the version of the present type definition, 202 designates a type name for definitely determining the type, 203 designates the number of attributes owned by the type, 204 designates a set of attributes owned by the type which has 202 attributes, 205 designates the number of procedures owned by the type and 206 designates a set or sets of procedures owned by the type and the number of the sets is stored in the above 205. More specifically, the attribute has an attribute object based on attribute meta-definition information indicated at 207 to 209 and the procedure has a procedure object based on procedure meta-definition information indicated at 210 to 214.

The meta-definition information of attribute is indicated at 207 to 209 in FIG. 2B wherein 207 designates an attribute name which is definite in the held type, 208 designates data type of the attribute for which only integer and character string can be used in the present embodiment, and 209 designates a data length of data of the attribute which is held in terms of byte number. For example, 4 is used for integer and a desired number designated by the user is used for character string.

The meta-definition information of procedure is indicated at 210 to 214 in FIG. 2C wherein 210 designates a selector name standing for a name of procedure, 211 designates the number of parameters held by the procedure, 212 designates a set of type definitions of parameters having the number indicated by the parameter number 211, 213 designates a type of a return value returned by the procedure and 214 designates an execution code which is the entity of the procedure.

The meta-definition information of relation is indicated at 215 to 224 in FIG. 3A wherein 215 designates a relation name for definitely determining a relation, 216 designates a classification of the relation which has 4 kinds of one to one, one to many, many to one and many to many, 217 designates the number of relation originator types, 218 designates type information on 217 relation originator types, 219 designates the number of relation destination types, 220 designates type information on 219 relation destination types, 221 designates information on a meaning of the relation which includes nothing (NULL) representative of a relation merely referred to and a parts relation (parts) in the present embodiment, 222 designates the number of attributes held by the relation, 223 designates information on attributes having the number indicated by the relation attribute number 222 and 224 designates a relation group for holding object pairs actually related to each other.

Meta-definition information of relation pair having objects being related to each other in combination is indicated at 225 to 227 in FIG. 3B wherein 225 designates an object identifier of an object standing for a relation originator, 226 designates an object identifier group of relation destination objects having relation to the relation originator objects 225, and 227 designates a relation attribute data group which holds attribute data pieces defined by the relation attribute 223 in the meta-definition of relation by the number indicated by the relation attribute number 222.

Meta-definition information of parts attribute object for holding definition change information of attribute is indicated at 228 to 233 in FIG. 4A wherein 228 designates a version number for managing the version of definition, 229 designates an operation code indicative of operation of attribute upon generation of the parts attribute object, 230 designates an update position indicating which attribute in the type definition is updated, 231 designates an attribute name of an appended attribute, 232 designates a data type of the appended attribute and 233 designates a data length of the appended attribute, the information represented by 231 to 233 being present only when the operation code 229 is appended.

Meta-definition information of parts procedure object for holding definition change information of procedure is indicated at 234 to 240 in FIG. 4B wherein 234 designates a version number for managing the version of definition, 235 designates an operation code indicative of operation of procedure upon generation of the parts object, 236 designates a selector name, 237 designates the number of parameters, 238 designates a group of parameter types having the number indicated by the parameter number 237, 239 designates a type of return value and 240 designates an execution code, the information represented by 239 and 240 being present only when the operation code 235 is appended.

Meta-definition information of relation management for managing a relation owned by an object is indicated at 241 and 242 in FIG. 5A wherein 241 designates a relation name of a relation which has already been subject to relation definition and owned by the object, and 242 designates a set of relation pair objects for holding a group of relation destination objects actually having relation to a relation originator object (the object of interest per se).

Indicated at 243 in FIG. 5B is meta-definition information of structure change information for holding attribute data appended to an object upon attribute definition change, this meta-definition information being used to hold an attribute data group.

FIGS. 6A to 6F show examples of a type definition object and a relation definition object which are present in a schema. Excepting a relation pair object 306, the above information is stored in the dictionary 108 and managed by the dictionary manager 104.

In the present embodiment, there are available a person type definition 301 having name and age at attribute and having an object identifier T1, a computer type definition 302 having type name, memory size and OS name at attribute and having an object identifier T2 and a processor type definition 303 having type name and mega-clock number at attribute and having an object identifier T3. Of areas labeled with dotted line in the type definition object, the former half is an object identifier of each definition object and the latter half is a parts object identifier generated upon update of attribute definition. An object identifier of a parts procedure object generated upon update of procedure definition is held. In the examples of FIGS. 6A to 6F, the computer type has an attribute parts object of object identifier P1 and a procedure parts object of object identifier P3. The individual parts objects are detailed in FIGS. 7A and 7B.

Also, in the present embodiment, a processor relation 304 is available having processor at relation name and having one to one parts relation to the computer type and processor type. An area labeled with dotted line of a relation definition object actually having a relation defined by the relation definition object 304 is an object identifier of each definition object. It will be seen from a relation pair set object 305 and the relation pair object 306 that a relation according to a relation name "processor" is established between an object having an object identifier O2 and an object having an object identifier O3. While the relation pair set object is held in the dictionary 108 for holding definition information, the relation pair object is held in the DB 107 for holding objects. This is because a parts object for managing the relation of an object also refers to the relation pair object. In FIG. 6E, to make clear the correspondence to a relation pair object, the relation pair object is indicated.

FIGS. 7A and 7B show examples of parts objects appended to the definition of FIGS. 6A to 6F. In these examples, "hard-disc size" is appended to the attribute of the computer type defined in FIG. 6B, the "OS name" is deleted and a procedure "onUnix" is appended. The parts object is stored in the DB 107 and managed by the parts object manager 102.

A parts attribute object 401 has an object identifier P1 and holds information for appending an attribute name "hard-disc size" to the computer type and deleting the attribute "OS name". A parts attribute object 402 has an object identifier P2 and holds information for appending an attribute name "ownership months". This attribute is definition information of an attribute of a relation to be described later.

A parts procedure object 403 has an object identifier P3 and holds information for appending parameter absence and return value logical type (boolean) to the computer type according to a selector name "onUnix". In FIG. 7B, however, an execution code is described as ⌈ ..... ⌋ and an interior detailing code is omitted.

FIGS. 8A to 8E show examples of objects based on the definition of FIGS. 6A to 6F. Of areas labeled by dotted line for system information owned by an object, the former half holds an object identifier of a type, a version number of the type and an object identifier of its own and the latter half holds an object identifier of a structure change object and an object identifier of a relation management object. This object is stored in the DB 107 and managed by the object manager 103.

An object 501 is a person type which has a name of Hitachi Taro and an age of 18 years, an object 502 is a computer type which has a type name of HT3010, a memory size of 32 (mega bytes) and an OS name of HDOS, an object 503 is a processor type which has a type name of HOOOSX and a 25-mega clock, and an object 504 is a processor type which has a type name of HOOOVX2 and a 66-mega clock. The object 502 holds a structure change object 505 having an object identifier PP1 and a relation management object 506 having an object identifier rcl.

The structure change object 505 has the object identifier PP1 and holds an attribute value "500" of the attribute "hard-disc size" appended by the parts attribute object 402. Here, the value "500" is a mere example.

The relation management object 506 holds the relation pair object 306 (FIG. 6F) for causing the relation "processor" owned by the computer object 502 to hold a relation originator object (computer object 502 itself) held by the object 506 and a relation destination object group. In FIG. 6F, the relation pair object 306 has a relation originator object O2 and a relation destination object O3. This accounts for the fact that the objects 502 and 503 have a processor relation.

FIGS. 9A to 9D show examples of a relation definition object, a relation pair set object, a relation management object and a relation pair object which are available after the relation is changed. In these examples, the definitions of processor relation owned by the objects 502 and 503 shown in FIGS. 8B and 8C are changed to a name "processors" and a relation classification of 1:n, and a "possessor" relation and its reverse relation which is a "possession" relation are newly defined between the person type and the computer type. Also, a "processors" relation is newly defined to the objects 502 and 504 and a possessor (and possession) relation is defined to the objects 501 and 502. Of the above information, the relation definition object is information to be stored in the directory 108 and the other is information to be stored in the DB 107.

As shown, a relation definition object 601 has a relation name "possession", an attribute definition of relation 402 (FIG. 7A) purporting 1:n between a relation originator type T1 (person type) and relation destination type T2 (computer type) and a relation pair set object 605; and a relation definition object 602 has a relation name "possessor", an attribute definition of relation 402 purporting 1:n between a relation originator type T2 (computer type) and relation destination type T1 (person type) and a relation pair set object 606. The relation definition objects 601 and 602 are related to each other in forward relationship and reverse relationship. As shown, a relation definition object 603 has a relation name "processors", an attribute definition of parts relating relation purporting 1:n between a relation originator type T2 (computer type) and relation destination type T3 (processor type) and a relation pair set object 604. In this object, the relation name and relation classification of the relation definition object 304 (FIG. 6D) are changed. Therefore, the object identifier coincides with R1

A relation management object 607 is obtained by changing the relation management object 506. In the object 607, the relation name "processor" is changed to "processors" and a relation name "possessor" of a newly appended relation and a relation pair object 611 are appended. A relation management object 608 has a relation name "possession" of a newly appended relation and a relation pair object 610. The relation management object 608 is so changed as to be held as a relation management object of the object 501.

In a relation pair object 609, a relation between the newly appended objects 502 and 504 is appended and hence an object 504 is appended to the relation destination object. A relation pair object 610 indicates a relation between the objects 501 and 502, and a relation pair object 611 indicates a relation between the objects 502 and 501.

Figure 10:
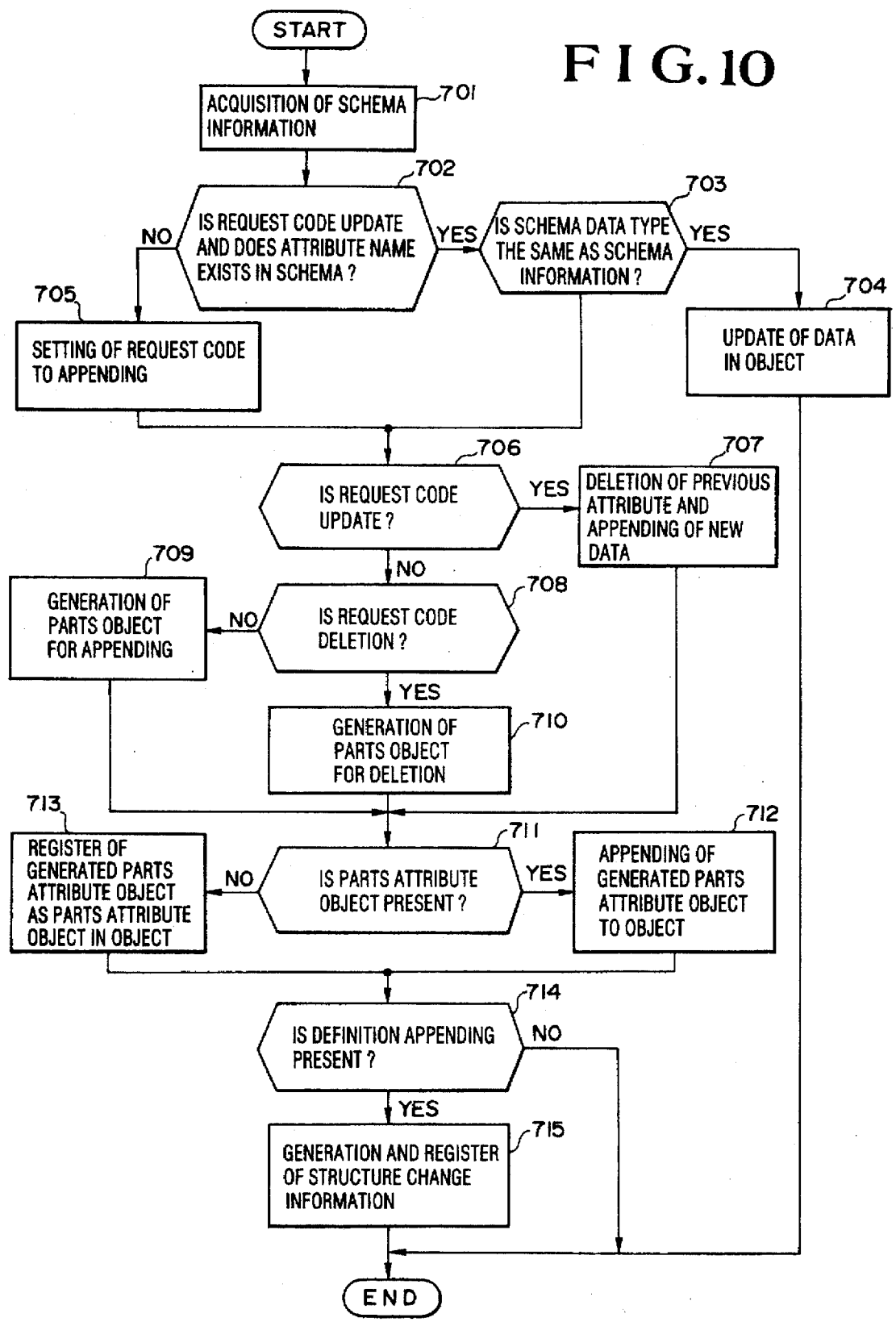
FIG. 10 is a flow chart for processing of attribute change.
Figure 11:
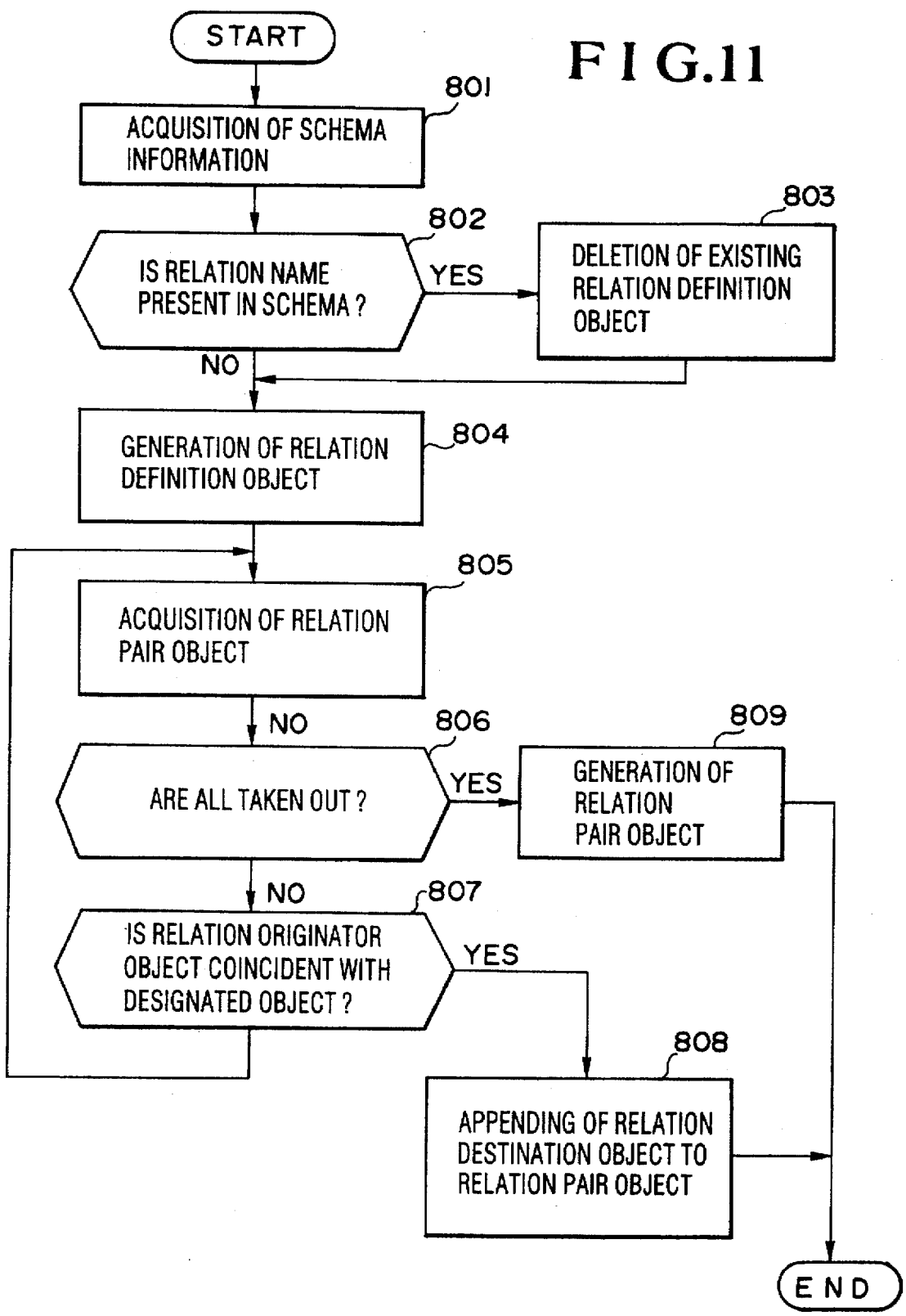
FIG. 11 is a flow chart for processing of relation change.
Figure 12:
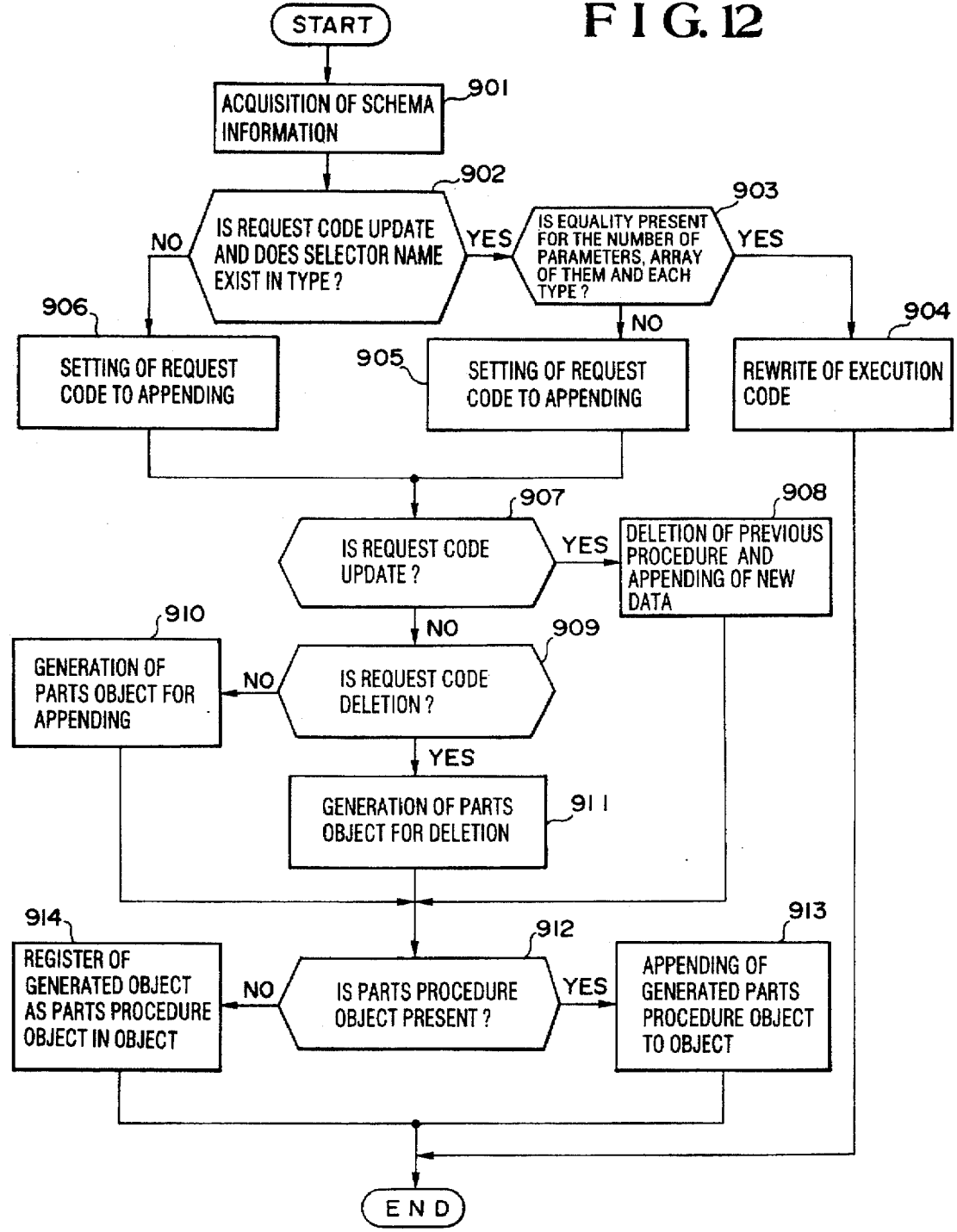
FIG. 12 is a flow chart for processing of procedure change.

FIGS. 10 to 12 are flow charts for processing of changing attribute/relation/procedure of an object according to the present invention. In each instance, the object manager 103 essentially plays a principal role in the processing, asks the dictionary manager 104 to perform the schema information processing and the parts object manager 102 to perform the parts object processing as necessary, and receives necessary data from these managers to reflect the contents of the DB 107.

FIG. 10 is a flow for processing of attribute change. When requesting the present processing, the user transfers an object identifier, a version number and a change request code (appending, deletion and update) upon definition change and change attribute information including attribute name, attribute type, type size and attribute value to the object manager 103 through the view manager 101. It is warranted that the attribute name, type, type size and attribute value to be designated are designated correctly. When every object is generated, updated and deleted, a journal is generated and delivered. In FIG. 10, steps 701 to 704 are processed by the dictionary manager 104, steps 709 to 715 are processed by the parts object manager 102 and the other steps are processed by the object manager 103.

In step 701, necessary schema information, i.e., a type definition object of an object indicated by an object identifier and an attribute definition object of the object are taken out of the dictionary 108. In step 702, it is examined whether a change request code is update and the designated attribute name exists. If existent, it is examined in step 703 whether the designated schema data type is the same as the schema information. If the same data type, the attribute value of the object on the DB 107 is directly changed in step 704 and the program ends. If non-existence of the attribute name in the schema is determined in step 702, the request code is changed to appending in step 705. When the request code is determined to be update in step 706, the previous attribute is deleted and a parts attribute object for holding appending of the designated attribute is generated in step 707. If the request code is determined to be deletion in step 708, a parts attribute object for deletion is generated in step 709 but if the determination in step 708 is not so, a parts attribute object for appending is generated in step 710. It is examined in step 711 whether the object designating the parts attribute object is held at the same version number and if held, information owned by the parts attribute object generated in the present processing is appended to the existing part attribute object on the DB 107 in step 712. If not held in step 711, the parts attribute object generated in the present processing is registered as a type definition object in the designated object in step 713. In step 714, it is examined whether the attribute appending processing is generated. If generated, a structure change object is generated and registered in the object on the DB 107 in step 715 and the program ends.

FIG. 11 is a flow for processing of relation change. When requesting the present processing, the user designates a relation name, a meaning of relation, a relation classification, a relation originator object and a relation destination object to the object manager 103 through the view manager 101. It is warranted that the relation information to be designated is designated correctly. In the case of appending, steps 804 to 809 are executed and in the case of deletion, steps 802 and 803 are executed. When every object is generated, updated and deleted, a journal is generated and delivered. In FIG. 11, steps 801 to 809 are processed by the dictionary manager 104 and the other steps are processed by the object manager 103.

In step 801, a relation definition object is taken out by referring to schema information, i.e., a relation name. In step 802, it is examined whether the relation name exists in the schema. If existent, the existing relation definition object on the dictionary 108 is deleted in step 803. But a relation pair set object is kept to be intact. In step 804, a relation definition object is generated in accordance with a designated parameter. At that time, a relation pair set object owned by the relation definition object deleted in step 803 is held. In step 805, relation pair objects are sequentially taken out of relation pair set object held by the relation definition object on the DB 107. The above processing is repeated until all relation pair objects are determined to be taken out in step 806. When the relation originator object coincides with a designated object in step 807, a designated relation destination object is appended to a relation destination object group of the taken-out relation pair object in step 808. If noncoincident, the next relation pair object is taken out. When all relation pair objects are taken out, a relation pair object is generated and registered in the relation pair set object.

FIG. 12 is a flow for processing of procedure change. When requesting the present processing, the user designates an object identifier, a change request code (appending, deletion and update), a selector name, a parameter group (type, value) and an execution code to the object manager 103 through the view manager 101. When every object is generated, updated and deleted, a journal is delivered. In FIG. 12, steps 901 to 903, 905 and 906 are processed by the dictionary manager 104, step 907 and ensuing steps are processed by the parts object manager 102 and the other step is managed by the object manager 103.

In step 901, schema information is taken out. In step 902, it is examined whether the change request code is update and the selector name is present in type information of a designated object. If existent, it is examined in step 903 whether equality is present for the number of parameters, array of them and each type. If equality exists, the execution code is rewritten in step 904 and the program ends. If inequality exists in step 903, the change request code is changed to appending in step 905. If non-existent in step 902, the change request code is changed to appending in step 906. If the change request code is determined to be update in step 907, the previous procedure is deleted and a parts procedure object for appending the designated procedure is generated in step 908. In step 909, it is examined whether the change request code is deletion. If not so, a parts object for appending is generated in step 910. If so in step 909, a parts object for deletion is generated in step 911. It is examined in step 912 whether the designated object has a parts procedure object. If so, generated procedure information is appended to the existing parts procedure object in step 913. If not so in step 912, the generated parts procedure object is registered in step 914.

Figures 13, 14:
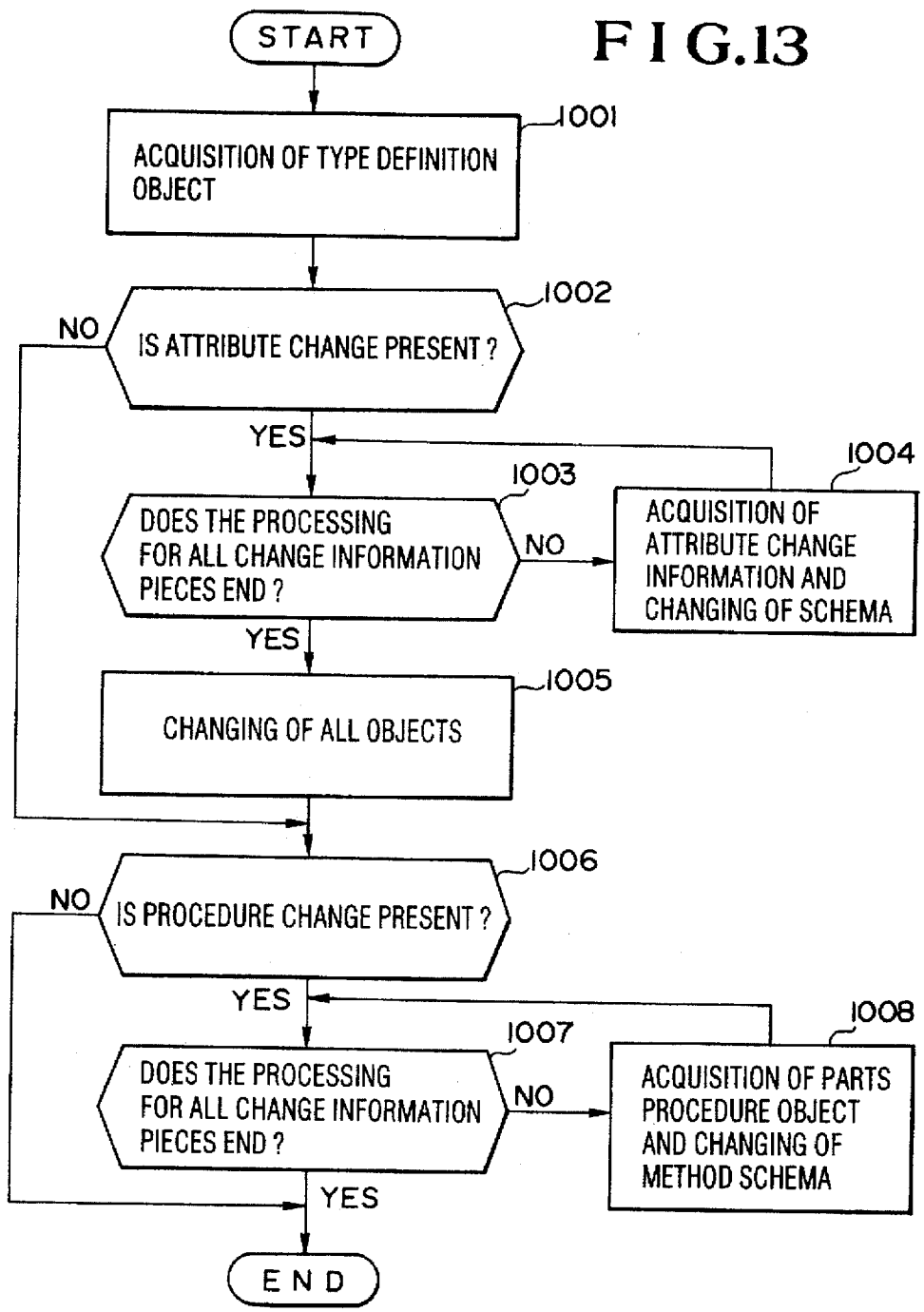
FIG. 13 is a flow chart for processing of reflecting a type definition change on data base restructuring.
FIG. 14 shows an example of view definition.

FIG. 13 is a flow for processing of reflecting a change in type definition when restructuring the DB. The user designates an object identifier of a type definition object to the object manger 103 through the view manager 101. In FIG. 13, steps 1001, 1004 and 1008 are processed by the dictionary manager 104 and the other steps are processed by the object manager 103.

In step 1001, the type definition object is acquired. The following processing is carried out until information of parts attribute object is determined to be absent in step 1002. In step 1003, it is examined whether the processing for all change information pieces owned by the parts attribute object ends. If unfinished, attribute change information is acquired from the parts object manager 102 in step 1004 and on the basis of this information, attribute information owned by the type definition object of schema is changed. In step 1005, all objects belonging to that type are changed on the basis of the type information after change. At that time, attribute data owned by a structure change object is used. In step 1006, it is examined whether a parts procedure object having procedure change information is present. If present, it is examined in step 1007 whether the processing for all change information pieces owned by the parts procedure object ends. If absent, a parts procedure object is acquired from the parts object manager 102 and on the basis of this information, procedure information of the type definition object in the schema is changed in step 1008.

FIG. 14 shows an example of view definition. In this example, a definition for setting the order of array of attributes in a schema definition is exemplified. The attribute of computer type indicates that type name, memory size and hard disc are accessed in this order for definition covered by a change designated by a version number.

Figure 15:
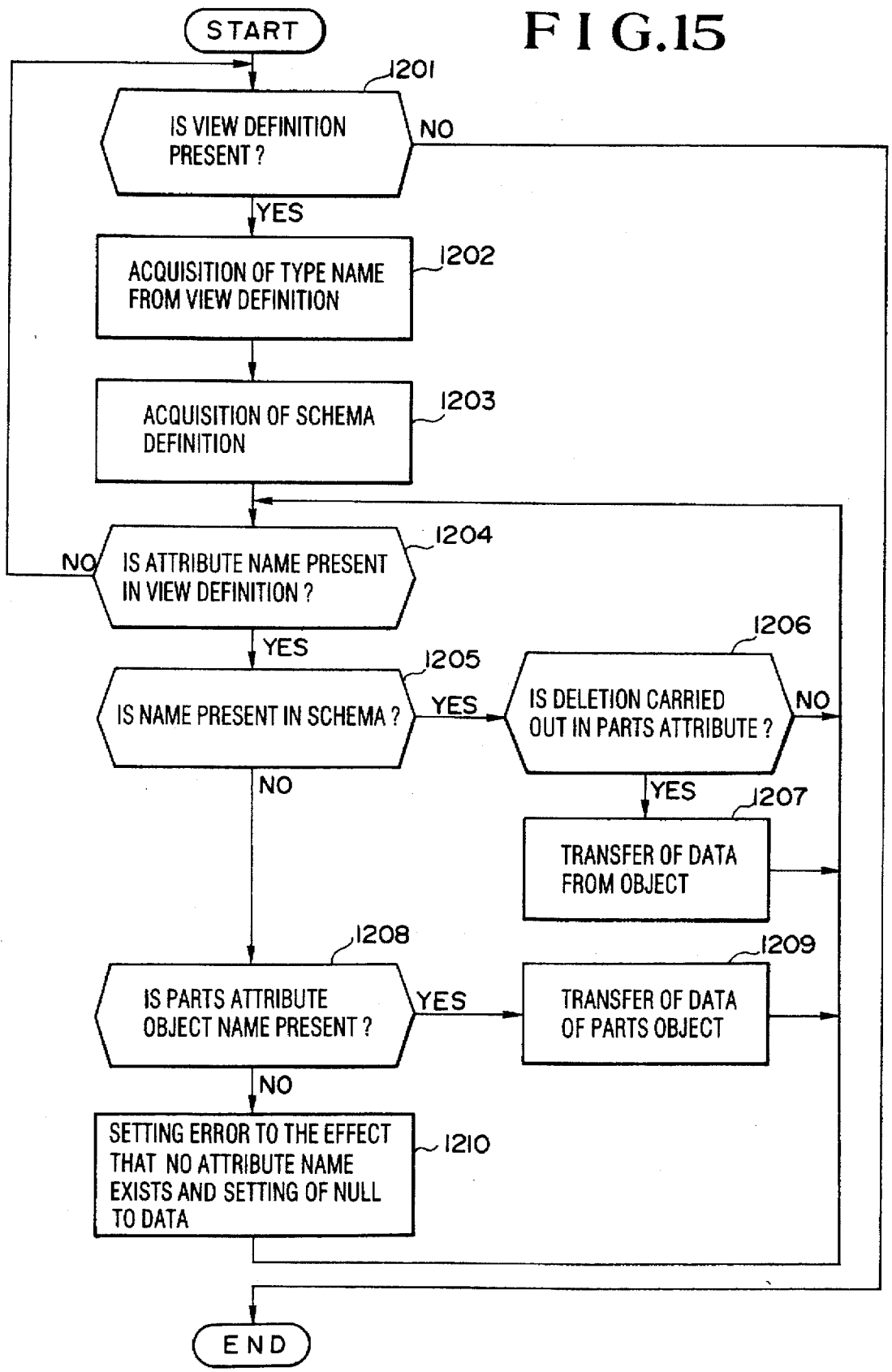
FIG. 15 is a flow chart for processing of realizing the view of FIG. 14.

FIG. 15 is a flow for processing of realizing the view shown in FIG. 14. The view manager 101 performs the present processing but asks the dictionary manager 104 to process schema information and the parts object manager 102 to process parts object. In FIG. 15, step 1203 is processed by the dictionary manager 104, and steps 1202, 1208 and 1209 are processed by the parts object manager 102. In step 1207, data is transferred from the object manager 103.

In step 1201, it is examined whether the view definition exists. The processing proceeds until the view definition disappears. If existent, in step 1202, a type name is acquired from the view definition. In step 1203, a type definition object is acquired on the basis of the type name acquired in step 1202. In step 1204, it is examined whether an attribute name is present in the view definition under the definition covered by the designated version. When the attribute name becomes absent, the program returns to step 1201. If existent, it is examined in step 1205 whether a designated name is present in the schema under the definition covered by the designated version. If present, it is examined in step 1206 whether deletion is carried out in parts attribute objects covered by the designated version. If deletion is not carried out, an attribute value is taken out from a transferred object and transferred to a user area in step 1207. If non-existent in step 1205, it is examined in step 1208 whether a name exists as appending attribute name in parts attribute objects covered by the designated version. If existent, an attribute value of structure change object of an object having an attribute value of appendix attribute of parts attribute object is transferred to the user area in step 1209. If non-existent in step 1208, an error to the effect that no attribute name exists is informed in step 1210. NULL data is transferred to the user area.

The embodiment of the present invention has been described but the invention may be constructed such that difference information between an old version definition object and an old version object is held in a parts object for holding definition change information of attribute, relation and procedure held by a definition object and in a parts object for holding structure change information of the object, whereby even after he definition information of the object is changed and the object per se is changed, old versions of the definition information of the object and of the object per se can be extracted.

At a certain time point, a definition object and a parts object for holding update information of the definition object can be united to the definition object to provide a new version object of the definition object, and an object and a parts object thereof can be united to the object.

As described above, according to the present invention, appending, deletion and definition change of attribute, relation and procedure of an object can be effected without changing a schema definition. Further, access to a user area can be carried out as in the case of an ordinary object and hence data operation can be performed easily. In addition, since a parts object per se can be utilized as a change history of definition and data, it is not necessary to newly adopt difference update information between changes in definition and data due to a change in schema.

We claim:

1. A method of extending objects in an object-oriented data base system having an object which includes an attribute, a relation and a procedure, and a definition object which includes definition information defining a structure of said object, said method comprising the steps of:

managing change information for changing a structure of said object defined in said definition information;

generating a new definition object by appending a parts definition object indicative of a change in said structure of said object to said definition object;

generating a new object by appending to said object a parts object representing changes in attribute, relation, and procedure of said object made in accordance with said change information; and accessing a data base by operating said new definition object.

2. The method recited in claim 1, wherein said object is stored in a data base.

3. The method recited in claim 1, wherein the definition object is stored in a dictionary file.

4. An object-oriented data base system comprising:

a data base for storing an object which includes an attribute, a relation and a procedure;

a dictionary file for storing a definition object which includes definition information defining a structure of said object;

a dictionary manager for generating a new definition object by appending a parts definition object indicative of change information of changes in said structure of said object defined in said definition information to said definition object;

means for generating a new object by appending to said object a parts object representing changes in attribute, relation, and procedure of said object made in accordance with said change information; and means for accessing said data base by operating said new definition object.

5. An object-oriented data base system as recited in claim 4, further comprising:

an area in said definition object for holding a parts definition object identifier for identifying said parts definition object;

an area in said object for holding a parts object identifier for identifying said parts object, wherein respective identifiers are registered in respective areas.

6. An object-oriented data base system as recited in claim 4, further comprising:

a journal file for storing said parts definition object as a change history of said change information of said structure of said object.

7. An object-oriented data base system as recited in claim 6, further comprising:

means for generating an update journal of said definition object when said new parts definition object is generated; and means for generating an update journal of said new object when said parts object is generated.

8. An object-oriented data base system as recited in claim 7, wherein said means for accessing a data base includes: a means for generating an updated definition objection from said definition object and said parts definition object, and a means for generating an updated object from said object and said parts object.

9. An object-oriented data base system as recited in claim 8, wherein said parts definition object, having information on a change in said structure, contains a version number, a change classification, a change position, an attribute name, a data type, and a data length.

10. An object-oriented data base system as recited in claim 7, wherein said parts definition object, having information on a change and definition of a procedure, contains a version number, a change classification, a selector name, a number of parameters, a parameter type, a type of return value, and execution code information.

11. An object-oriented data base system as recited in claim 7, wherein said definition object defining a structure of said objects contains a relation name, a relation classification, a number of types and a type information group of relation originator, a number of types in a type information group of relation destination, relation meaning information, an attribute information group held by a relation, and a set of relation pair objects each having a relation originator object group, a relation destination object group, and a relation attribute data group.

12. An object-oriented data base system as recited in claim 11, wherein said object contains a relation management object for holding a relation name and a relation pair object group.

13. An object-oriented data base system as recited in claim 12, wherein a definition object, after the definition change is generated from said definition object and a part object having the definition change information, and wherein an object, after the definition change, is generated as a dynamic view from said object and a parts object for holding information on a change of said structure of said object.

14. A method for extending object in an object-oriented data base system having an object which includes an attribute, a relation, and a procedure, and a definition object which includes definition information defining a structure of said object, said method comprising the steps of:

storing an object having an attribute, a relation, and a procedure in a data base;

storing a definition object having definition information defining a structure of said object in a dictionary file;

generating a parts definition object indicative of change information of changes in a structure of said definition object;

appending a definition object indicative of said parts definition object to said dictionary file;

storing a parts object indicative of data newly appended to said object as a result of a change in said structure of said definition object in said data base; and performing processing of access to said data base by using said object and said parts object.

15. A method as recited in claim 14, further comprising:

storing said parts object as a change history of said change information of said structure of said definition object.

16. A method as recited in claim 14, further comprising:

generating an updated definition object from said definition object and said part definition object; and managing said generated definition object.

17. A method as recited in claim 14, further comprising:

generating an updated object from said object and said parts object; and managing said generated object.

18. A computer program product for use with a computer having a display device, comprising:

an object-oriented data base system having an object which includes an attribute, a relation, and a procedure, and a definition object which includes definition information defining a structure of said object; and a computer readable medium with a computer program recorded thereon, the program including:
 (a) a first code for causing the computer to manage change information of changes in said structure of said object,
 (b) a second code for causing the computer to generate a new definition object by appending a parts definition object indicative of said change in said structure of said object to said definition object,
 (c) a third code for causing the computer to generate a new object by appending to said object a parts object representing changes in attribute, relation, and procedure of said object made in accordance with said change information; and
 (d) a fourth code for causing the computer to access a data base by operating said new definition object.

19. A computer program product for use with a computer having a display device, comprising:

a computer readable medium with a computer program reported thereon, the program including:
 (a) a first code for storing an object having an attribute, a relation, and a procedure in a data base,
 (b) a second code for causing the computer to store a definition object having definition information defining a structure of said object in a dictionary file,
 (c) a third code for causing the computer to generate a parts definition object indicative of change information of changes in a structure of definition object,
 (d) a fourth code for causing the computer to append a definition object indicative of said parts definition object to said dictionary file,
 (e) a fifth code for causing the computer to store a parts definition object indicative of data newly appended to said object as a result of a change in said structure of said definition object in said data base, and
 (f) a sixth code for causing the computer to perform processing of access to said data base by using said object and said parts object.

20. A method for extending objects in an object-oriented data base system, said data base system having an object which includes an attribute, a relation and a procedure, and a definition object which includes definition information defining a structure of said object, said method comprising the steps of:

managing change information for changing the structure of said object defined in said definition information;

generating a new definition object by appending a parts definition object indicative of a change in said structure of said object to said definition object;

generating a new object by appending to said object a parts object representing said change in said structure of said object; and accessing a data base by operating said new definition object.

* * * * *